United States Patent
Lewis et al.

[15] 3,701,305
[45] Oct. 31, 1972

[54] HYDRAULIC BRAKE BOOSTER WITH BALL VALVES

[72] Inventors: Richard L. Lewis, South Bend, Ind.; Edward J. Goscenski, Jr., Marshall, Mich.

[73] Assignee: The Bendix Corporation

[22] Filed: Jan. 13, 1971

[21] Appl. No.: 106,189

[52] U.S. Cl. ............................ 91/457, 91/391
[51] Int. Cl. ................... F15b 11/08, F15b 13/10
[58] Field of Search ........... 91/391, 457; 137/596.2

[56] References Cited

UNITED STATES PATENTS

| 2,478,002 | 8/1949 | Mott | 91/457 X |
| 2,752,947 | 7/1956 | Hruska | 137/596.2 |
| 2,837,114 | 6/1958 | Ruhl | 137/596.2 |
| 2,934,042 | 4/1960 | Stelzer | 91/457 X |
| 2,976,849 | 3/1961 | Stelzer | 91/391 X |
| 2,980,066 | 4/1961 | Stelzer et al. | 91/391 X |

*Primary Examiner*—Martin P. Schwadron
*Assistant Examiner*—Irwin C. Cohen
*Attorney*—Ken C. Decker and Plante, Hartz, Smith and Thompson

[57] ABSTRACT

A hydraulic brake booster is disclosed which includes a pair of ball valves which control fluid communication between the booster pressure chamber and the fluid pressure source and between the booster pressure chamber and a fluid reservoir. Each of the ball valves is provided with a valve stem. Each of the valve stems engage opposite sides of an operator-operated lever which extends between stems. The lever is normally urged toward a position opening one of the valves to communicate the chamber with the reservoir and closing the other valve. However, when a brake application is effected, the lever is shifted to close fluid communication between the pressure chamber and the reservoir and initiate fluid communication between the pressure source and the pressure chamber.

3 Claims, 1 Drawing Figure

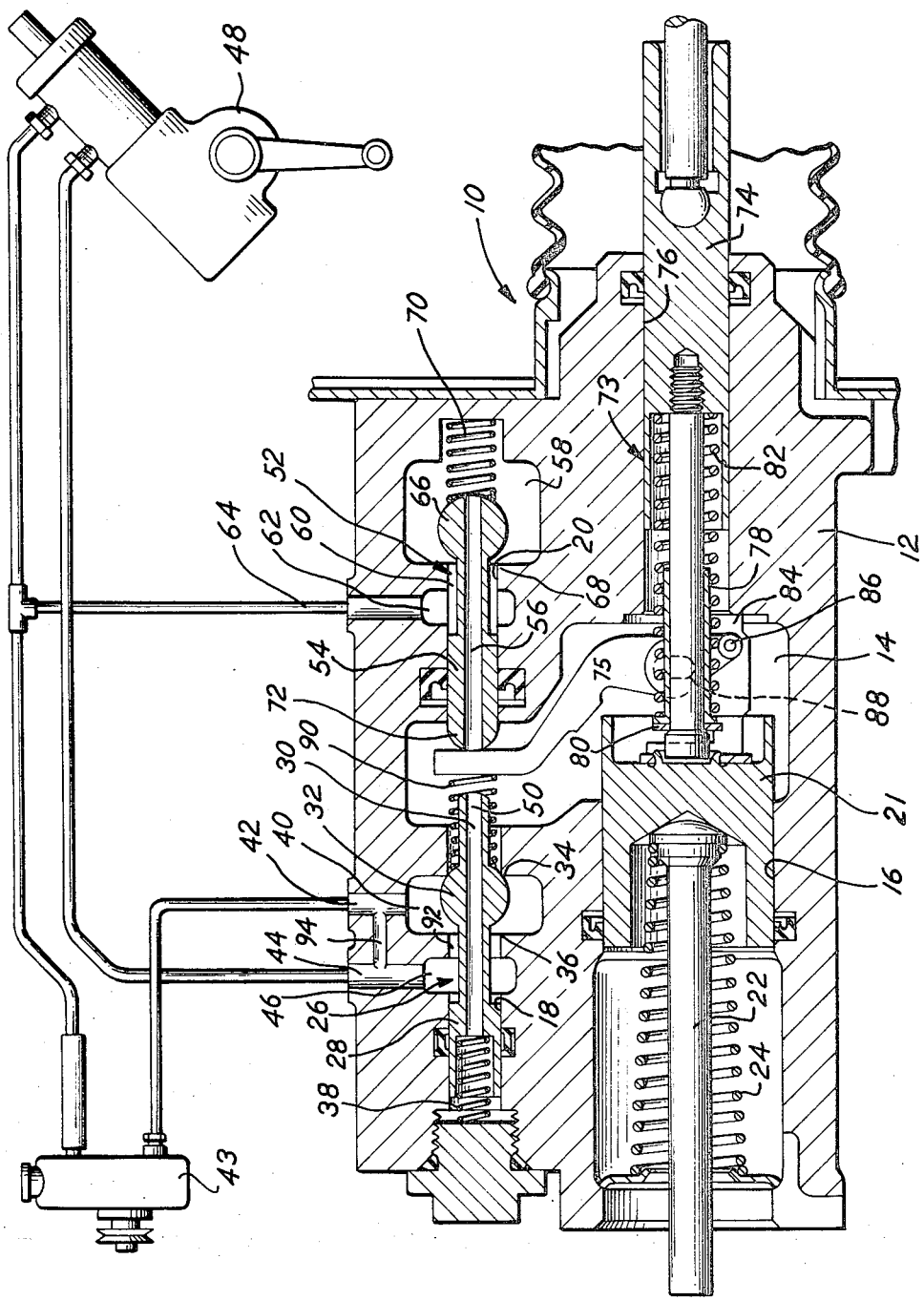

3,701,305

HYDRAULIC BRAKE BOOSTER WITH BALL VALVES

BACKGROUND OF THE INVENTION

This invention relates to a hydraulic brake booster.

A hydraulic brake booster requires a valving mechanism that controls fluid communication between a pressure source and a booster pressure chamber and between a fluid reservoir and the booster pressure chamber. The valve must assure that fluid in the vehicle's hydraulic system is passed through the booster without leakage into the booster pressure chamber, which is communicated to reservoir when the brakes of the vehicle are released. After a brake application is effected, communication between the booster pressure chamber and the reservoir must be terminated, and the pressure chamber must be communicated with the fluid pressure source. Although spool valves perform these functions quite well, the ball valve disclosed herein is less costly, requires fewer critical dimensions, and does not malfunction as often as an equivalent spool valve.

SUMMARY OF THE INVENTION

Therefore, an important object of our invention is to provide a valve for use in a hydraulic brake booster that requires fewer critical dimensions than do valves used in brake boosters known in the prior art.

Another important object of our invention is to reduce the likelihood of a malfunctioning brake booster because the valve used therein "sticks," and therefore, cannot be opened to communicate fluid into the booster pressure chamber.

A still further important object of our invention is to reduce the cost and increase the reliability of hydraulic brake booster.

DESCRIPTION OF THE DRAWINGS

The sole FIGURE of the drawing is a schematic view of a vehicle hydraulic system with a brake booster made pursuant to the teachings of our present invention illustrated in cross section.

DETAILED DESCRIPTION

Referring now to the drawings, a hydraulic brake booster generally indicated by the numeral 10 includes a housing 12 defining a pressure chamber 14 therewithin. The housing 12 further defines a first bore 16, a second bore 18, and a third bore 20, each of which communicates with the pressure chamber 14. A piston 20 is slidably mounted in the bore 16, and one end of the piston 20 extends into the pressure chamber 14. A rod 22 connects the other end of the piston 20 with the pistons of a standard automotive master cylinder (not shown) mounted to the left of the housing 12. A spring 24 yieldably urges the piston 20 to the right viewing the FIGURE, toward the brake release position.

A first valve member generally indicated by the numeral 26 includes an annular valve stem 28 defining a fluid passage 30. The stem 28 is slidably mounted in the bore 18, and carries a sphere 32 which is adapted to sealingly engage either a first valve seating area 34 or a second valve seating area 36 provided on the wall of the bore 18. A spring 38 yieldably urges the first valve member 26 toward a position in which the sphere 32 sealingly engages the seat 34. The sphere 32 reciprocates within an inlet chamber 40 defined within the bore 18 between the valve seating areas 34 and 36. An inlet port 42 communicates the outlet or high pressure side of the power steering pump 43 of the vehicle with the chamber 40. Similarly, an outlet port 44 communicates an outlet chamber 46 defined within the bore 18 with the inlet of the vehicle's power steering gear 48. The outlet of the power steering gear 48 is communicated with a fluid reservoir at the inlet of the power steering pump 43. One end 50 of the stem 28 projects from the bore 18 into the pressure chamber 14.

A second valve assembly 52 includes an annular valve stem 54 defining a fluid passage 56 extending therethrough communicating a chamber 58 within the bore 20 with the pressure chamber 14. The stem 54 is provided with a reduced diameter section that cooperates with the wall of the bore to define an annulus 60 communicating the chamber 58 with an exhaust chamber 62. An exhaust port 64 communicates the exhaust chamber 62 with the aforementioned fluid reservoir at the inlet of the pump 43. A sphere 66 is carried on one end of the valve stem 54 and is yieldably urged into sealing engagement with a valve seating area 68 on the wall of the bore 20 by a spring 70. The other end 72 of the valve stem 54 projects into the pressure chamber 14.

The valve assemblies 26 and 52 are actuated by operator-actuated means indicated generally by the numeral 73. Operator-actuated means 73 includes an input rod 74 which is slidably mounted in a smaller diameter portion 76 of the bore 16. One end of the input rod 74 extends into the pressure chamber 14 where it is telescopically received by a sleeve 78. The other end of the input rod 74 is connected to a brake pedal (not shown) mounted in the operator's compartment of the vehicle. The sleeve 78 is yieldably urged into engagement with a stop ring 80 carried by the input rod 74 by a spring 82. Operator-actuated means 73 further includes lever means 75, one end of which is pivotally secured to a bracket 84 carried by the piston 20 by first pivot means 86. A second pivot means 88 pivotally connects the sleeve 78 to the lever means 75. The other end of the lever means 75 extends between the ends 50 and 72 of the valve stems 28 and 54, which, as can be seen on the drawing, are substantially coaxial. Opposite sides of the lever means 75 are adapted to engage one of the corresponding ends 72 or 50 of the valve stems 28 or 54. A spring 90 yieldably urges the lever means 75 into engagement with end 72 of valve stem 54 and thereafter urges lever means 75 and the valve stem 54 as a unit to the right viewing the FIGURE so that sphere 66 is normally maintained out of sealing engagement with the valve seating area 68.

MODE OF OPERATION

The brake booster 10 is illustrated in the drawings with the various components thereof disposed in the position they assume when the brakes of the vehicle are released. In this condition, the sphere 32 is sealingly engaged with the valve seating area 34 so that substantially all of the fluid flowing into the inlet chamber 40 is communicated directly to the outlet chamber 46 through an annulus 92 defined between the reduced diameter portion of the stem 28 and the wall of the bore 18. Since the spring 90 is sufficiently strong to maintain the sphere 66 out of engagement with the valve seating area 68, the booster pressure chamber 14 is vented to the exhaust chamber 62 through the passage 56, chamber 58, and the annulus 60.

When a brake application is effected, the input rod 74 is urged to the left viewing the drawings. Since the spring 82 is sufficiently strong to maintain the sleeve 78 in engagement with the stop ring 80, the rod 74 and the sleeve 78 normally move together as a unit when the brakes are actuated, thereby pivoting the lever means 75 about the pivot 86. When this occurs, the other end of the lever means 75 moves away from the end 72 of the valve stem 54, thereby permitting the spring 70 to urge the sphere 66 into sealing engagement with the valve seating area 68, to terminate fluid communication from the chamber 58 to the chamber 62 through the annulus 60. Fluid communication from the pressure chamber 14 to the outlet 64 is thereby prevented. As the lever means 75 is moved further, the other side of the lever means 75 engages the end 50 of the valve stem 28. Sphere 32 is then driven away from the valve seating area 34 and toward the valve seating area 36. The sphere 32 then cooperates with the valve seating area 36 to define a flow restricting orifice therebetween to inhibit flow of fluid through the annulus 92 from the chamber 40 to the chamber 46, thereby increasing the fluid pressure lever in the chamber 40. The high pressure fluid in the chamber 40 flows through the opening defined between the sphere 32 and the seating area 34, into the pressure chamber 14. High pressure fluid in the chamber 14 acts against the end of the piston 20 to urge the latter to the left viewing the FIGURE, thereby effecting a brake application. Even if sufficient force is applied to lever means 75 to drive the sphere 32 into sealing engagement with the valve seating area 36, fluid communication between the inlet port 42 and the outlet port 44 is never completely terminated. A small passage 94 always permits a portion of the fluid flowing into the inlet port 42 into the outlet port 44 so that a sufficient amount of fluid will always be available to assure proper operation of the vehicle's steering gear 48.

When the brakes of the vehicle are subsequently released, the spring 38 urges the sphere 32 back into sealing engagement with the valve seating area 34, thereby again closing fluid communication between the high pressure fluid in the inlet chamber 40 and the booster pressure chamber 14. At the same time, the return spring 24 urges the piston 20 to the right viewing the FIGURE, toward the brake release position. The spring 90 thereafter urges the lever means 75 into engagement with the end 72 of the valve stem 54, and thereafter urges the valve assembly 52 and lever means 75 as a unit toward the right viewing the FIGURE until the sphere 66 is urged off of the valve seating area 68, to again permit communication between the booster pressure chamber 14 and the exhaust port 64.

If a malfunction should prevent fluid communication into the pressure chamber 14 when a brake application is effected, the vehicle operator may apply the brakes manually. If this occurs, the much higher actuating force required of the vehicle operator collapses the spring 82, permitting the stop ring 80 to move away from the sleeve 78 so that the end of the input rod 74 will engage the end of the piston 20. Further movement of the input rod 74 moves the latter and the piston 20 as a unit to effect a brake application in the normal manner.

We claim:
1. In a hydraulic brake booster:
a housing defining a chamber therewithin;
a piston shiftable in said chamber;
first valve means within said housing for controlling fluid communication between said chamber and a source of fluid pressure;
second valve means within said housing for controlling fluid communication between said chamber and a fluid reservoir;
resilient means operably connected to each of said first and second valve means yieldably urging each of the latter to a position terminating fluid communication between the chamber and said pressure source and between the chamber and the reservoir; and
operator-operated means for operating each of said valve means shiftable from a normal condition to an actuated condition when a brake application is effected;
said operator-operated means in said normal condition opening said second valve means to permit fluid communication between said chamber and the reservoir, said operator-actuated means in said actuated condition opening said first valve means to permit fluid communication into said chamber from said pressure source;
said operator-operated means including a control rod extending from said housing, and lever means extending between said first and second valve means and the control rod and pivotally connected to the latter; and
spring means yieldably urging said lever means into engagement with said second valve means and thereafter urging said lever and said second valve means as a unit toward a position opening said second valve means to permit fluid communication between the chamber and the reservoir;
each of said first and second valve members including an annular valve seat, a valve stem, and a sphere mounted on said valve stem for engagement with said seat;
said resilient means including a pair of springs, each of said springs being disposed to urge a corresponding one of said spheres into engagement with said valve seat;
said first and second valve means being disposed on opposite sides of said lever means;
each of said stems including a portion engaging a corresponding side of said lever means.
2. In a hydraulic brake booster:
a housing defining a chamber therewithin;
a piston shiftable in said chamber;
first valve means within said housing for controlling fluid communication between said chamber and a source of fluid pressure;
second valve means within said housing for controlling fluid communication between said chamber and a fluid reservoir;

resilient means operably connected to each of said first and second valve means yieldably urging each of the latter to a position terminating fluid communication between the chamber and said pressure source and between the chamber and the reservoir; and operator-operated means for operating each of said valve means and shiftable from a normal condition to an actuated condition when a brake application is effected;

said operator-operated means in said normal condition opening said second valve means to permit fluid communication between said chamber and the reservoir, said operator-actuated means in said actuated condition opening said first valve means to permit fluid communication into said chamber from said pressure source;

said housing defining a bore therewithin;

said operator-operated means including a control rod extending from said housing and lever means pivotally connected to said control rod;

said first valve means including an annular valve seat mounted in a first section of said bore, a valve stem extending from the latter and adapted to be engaged by one side of said lever means, and a sphere mounted on said valve stem for engagement with said valve seat;

said second valve means including an annular valve seat mounted in a said second section of said bore, a valve stem extending from the latter and adapted to be engaged by the other side of said lever means, and a sphere mounted on said last-mentioned valve stem for engagement with said last-mentioned valve seat.

3. A fluid system comprising:

a fluid pressure source and a fluid motor;

a housing defining first and second bores therewithin, each of said bores being communicated with said fluid motor;

said first bore being communicated with said fluid pressure source;

said second bore being communicated with a fluid reservoir;

operator-operated lever means within said housing;

first valve means including a valve seat mounted on said first bore, a valve stem, and a sphere mounted on said stem for engagement with the seat, said stem extending from said first bore for engagement with one side of said lever means; and second valve means including a valve seat mounted in said second bore, a valve stem, and a sphere mounted on said valve stem for engagement with said seat, said stem extending from said second bore for engagement with the other side of said lever means.

* * * * *